United States Patent [19]

Nagai

[11] 4,246,523
[45] Jan. 20, 1981

[54] BRAKE TIMING CONTROL METHOD AND APPARATUS THEREFOR

[75] Inventor: Shun-ichi Nagai, Komatsu, Japan

[73] Assignee: Kabushiki Kaisha Komatsu Seisakusho, Tokyo, Japan

[21] Appl. No.: 964,164

[22] Filed: Nov. 28, 1978

[30] Foreign Application Priority Data

Feb. 9, 1978 [JP] Japan .................................. 53-14341

[51] Int. Cl.³ .............................................. H02P 3/00
[52] U.S. Cl. .................................. 318/369; 318/626; 192/140; 192/142 R; 100/48
[58] Field of Search ............... 318/369, 626; 192/120, 192/140, 142 R, 146, 147; 108/48

[56] References Cited

U.S. PATENT DOCUMENTS

| | | | |
|---|---|---|---|
| 2,816,635 | 12/1957 | Danly et al. | 192/147 |
| 3,277,355 | 10/1966 | Troutman et al. | 318/369 |
| 3,450,911 | 6/1969 | Smith | 192/12 D |
| 3,761,790 | 9/1973 | Daab | 318/369 |
| 3,795,853 | 3/1974 | Whitehouse | 318/626 |
| 3,872,365 | 3/1975 | Vignaud et al. | 318/369 |
| 3,893,695 | 7/1975 | Rickert | 318/369 |
| 4,022,307 | 5/1977 | Berrie et al. | 192/12 D |
| 4,040,508 | 8/1977 | Sunada et al. | 192/12 D |

Primary Examiner—David Smith, Jr.
Attorney, Agent, or Firm—Armstrong, Nikaido, Marmelstein & Kubovcik

[57] ABSTRACT

Disclosed is a brake timing control method and apparatus for use with a press machine including a press slide driven through a crank shaft by a variable speed motor to stop the moving press slide at its top dead center regardless of the speed of rotation of the crank shaft. The motor speed is detected and converted into a voltage proportional to the motor speed which is then integrated as a first voltage. A second voltage is provided in accordance with a line or curve representing as a function of motor speed the approximation of the slip angle through which the crank shaft will continue to rotate after braking is initiated. The first and second voltages are additively combined and compared with a reference voltage to provide a stop signal for initiating braking on the press machine when the sum of the first and second voltages reaches the reference voltage.

3 Claims, 9 Drawing Figures

BRAKE TIMING CONTROL METHOD AND APPARATUS THEREFOR

BACKGROUND OF THE INVENTION

1. Field of the Invention

This invention relates to a brake timing control method and apparatus therefor and, more particularly, to a method and apparatus useful in connection with a variable speed press machine for bringing the press slide to stop at its top dead center in every stroke thereof, regardless of the speed of operation of the press machine or the name of strokes of the press slide per minute which are customarily represented by revolutions per minute (r.p.m.).

2. Description of the Prior Art

In machining articles with a press machine such as including a press slide driven through a crank shaft by a variable speed motor, it is often necessary in view of safety, easy finished article removal and other considerations to provide such a brake timing control as enabling the press slide to positively stop at its top dead center in every stroke thereof. The prime factor to consider in such brake timing control is the slip angle through which the crank shaft as well as the press slide continues to rotate after braking is initiated. Such slip angle is caused by inertia forces of the moving parts such as the press slide, the crank shaft, etc., and its degree varies in proportion to the speed of rotation of the crank shaft or the number of strokes of the press slide. It is therefore apparent that braking on the press machine should be initiated when the crank shaft reaches an angular position prior to the top dead center by a slip angle according to the number of strokes of the press slide concerned.

One of conventional brake timing controls has been accomplished by employing several rotary cams mounted for coordinated or synchronized rotation with the crank shaft to actuate respective rotary cam switches. One of the rotary cam switches is selectively actuated by the associated rotary cam in accordance with the speed of rotation of the crank shaft or the number of strokes of the press slide for initiating braking on the press machine when the crank shaft reaches a predetermined angular position. However, such convertional brake timing control often fails to stop the moving press slide at its top dead center.

As an example, a press machine will be considered which is operable at strokes ranging from 100 r.p.m. to 220 r.p.m. and exhibits a slide angle of 60 degrees at 100 r.p.m. and a slide angle of 180 degrees at 220 r.p.m. If only one rotary cam is provided so as to actuate its associated rotary cam switch for initiating braking on the press machine when the crank shaft rotates at 180 derees, the crank shift will stop at its top dead center (180+180=360 degrees) at the 220 r.p.m., while it will stop at an angular position of 180+60=240 degrees at the 100 r.p.m.. That is, such brake timing control using one rotary cam will cause a maximum angular position dispersion of 360−240=60 degrees. If three rotary cams are provided, one of which is selected to actuate its associated rotary cam switch in accordance with the number of strokes of the press slide, the dispersion will be reduced to one-third the dispersion found in the above brake timing control using only one rotary cam and rotary cam switch pair. The dispersion can be further reduced by providing an increased number of rotary cam and rotary cam switch pairs, but this will result in a complex and expensive arrangement.

SUMMARY OF THE INVENTION

In view of the foregoing factors and conditions of the prior art, it is a primary object of the present invention to eliminate the above disadvantages and limitations.

Another object of the present invention is to provide an improved brake timing control method and apparatus therefor useful in connection with a press machine including a press slide driven through a crank shaft by a variable speed motor for bringing the press slide to positively stop at its top dead center in every stroke thereof, regardless of the speed of rotation of the motor or the number of strokes of the press slide.

Still another object of the present invention is to provide an improved brake timing control method and apparatus of the character described which is operable over a wide motor speed or wide range of the number of strokes of the press slide.

In accordance with the present invention, there is provided a novel brake timing control method and apparatus for use with a press machine including a press slide driven through a crank shaft by a variable speed motor for positively stopping the moving press slide at its top dead center regardless of the speed of rotation of the motor or the number of strokes of the press slide. The motor speed is detected and converted into a voltage proportional to the motor speed which in turn is integrated. A voltage is provided which represents a slip angle through which the crank shaft as well as the press slide will continue to rotate or move after braking is initiated on the press machine in accordance with the motor speed. The voltage and the integrated voltage are added and the sum thereof is compared with a predetermined reference voltage to provide a stop signal for initiating braking on the press machine when the sum of the former two voltages reaches the reference voltage.

In accordance with one aspect of the present invention, there is provided a simple arrangement useful particularly in connection with a press machine operable with a relatively small range of the number of strokes of the press slide, which comprises detedtor means responsive to the speed of rotation of the motor for providing an output voltage proportional to the motor speed, first invertor means receiving the output voltage of the detector means for inverting the same, second invertor means receiving the inverted output voltage of the first invertor means for inverting the same again, intergrator-invertor means receiving the output voltage of the second invertor means for integrating and inverting the same, means for actuating and resetting the integrator-invertor means during each stroke of the press slide, circuit means responsive to the output of the first invertor means for providing an output voltage representing a slip angle through which the crank shaft as well as the press slide will continue to rotate or move after braking is initiated on the press machine, a reference voltage source for providing a predetermined reference voltage, and comparator means receiving the voltages derived from the integrator means and the circuit means and also the reference voltage for additively combining them to provide a stop signal for initiating braking on the press machine when the sum of the former two voltages reaches the reference voltage, so that the press slide can be brought to positively stop at its top dead center regardless of the speed of rotation of the crank shaft. The circuit means may be in the form of a resistor having its one end connected to the output of the first invertor means and the other end connected to the input of the comparator means.

In accordance with another aspect of the present invention, there is provided an arrangement useful particularly in connection with a press machine operable over a wide range of the number of strokes of the press slide, which comprises detector means responsive to the speed of rotation of the motor for providing an output voltage proportional to the motor speed, first invertor means receiving the output voltage of the detector means for inverting the same, second invertor means receiving the inverted output voltage of the first invertor means for inverting the same again, number of strokes range detector means responsive to the output voltage of the second invertor means for specifying one from a plurality of ranges of the number of strokes predetermined such that each approximated slip angle characteristic is available in each range of the number of strokes, first circuit means receiving the output voltage of the second invertor means for providing an output voltage according to the range of the number of strokes specified by the number of strokes range detector means, second circuit means receiving the output voltage of the first invertor means for providing an output voltage representing a slip angle through which the crankshaft as well as the press slide will continue to rotate after braking is initiated on the press machine in accordance with the range of the number of strokes specified by the number of strokes range detector means, integrator-invertor means receiving the output voltage of the first circuit means for integrating and inverting the same, means for actuating and resetting the integrator-invertor means during each stroke of the press slide, a reference voltage source for providing a predetermined reference voltage, and comparator means receiving the voltages derived from the integrator-invertor means and the second circuit means and also the reference voltage for additively combining them to provide a stop signal for initiating braking on the press machien when the sum of the former two voltages reaches the reference voltage so that the press slide can be brought to positively stop at its top dead center regardless of the speed of rotation of the crank shaft.

BRIEF DESCRIPTION OF THE DRAWINGS

A better understanding of the present invention as well as other objects and further features thereof will become apparent upon consideration of the following detailed disclosure thereof, especially when taken with the accompanying drawings, in which.

DETAILED DESCRIPTION OF THE PREFERRED EMBODIMENTS

Figure 1:
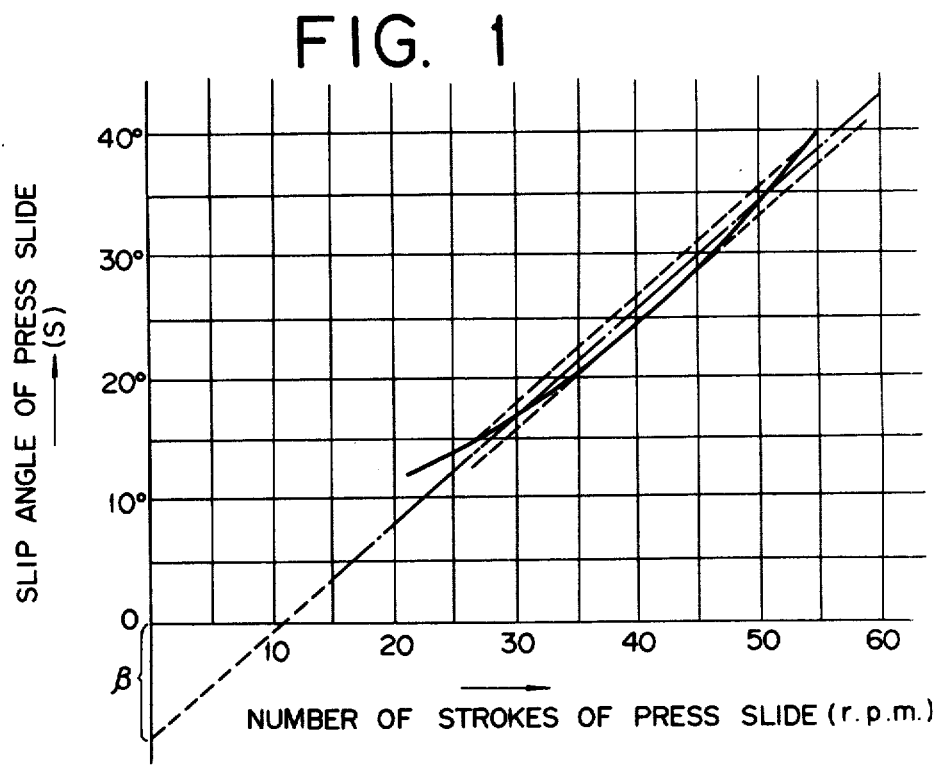
FIG. 1 is a graph showing slip angle as a function of the number of strokes of the press slide with its approximation.

The present invention is concerned with a brake timing control method and apparatus therefor intended for use with a press machine such as including a press slide driven through a crank shaft by a variable speed motor to stop the moving press slide at its top dead center in every stroke thereof, regardless of the speed of rotation of the motor. First, consideration is made on the slip angle through which the crank shaft as well as the press slide will continue to rotate or move after braking on the press machine in initiated. Referring to FIG. 1, it will be seen that the slip angle varies as a function of the speed of rotation of the crank shaft or the number of strokes of the press slide per minute which are customarily represented by revolutions per minute (r.p.m.). In FIG. 1, the solid curve indicates an actually measured slip angle characteristics which may be approximated with a linear line indicated by the dot-dash line within such a relatively small and narrow range of the number of strokes that error caused by such approximation is less than ±1.5% which is a level creating no problem in practice. However, if the range of the number of strokes is so large and wide as to cuase the approximation with a linear line to provide more than ±3% error, the sum of error due to the linear approximation and error due to electrical and mechanical scatter will be more than ±8% with the result that the brake monitor set at 10 degrees will be actuated during normal operation. Thus, it is required in this case to utilize another method such as approximation with a curve or secondary degree or one to be described later.

As clearly shown in FIG. 1, the linear line indicated by the dot-dash line extends from an imaginary angle of $-\beta$ and may be expressed as follows:

$$S = K_1 \cdot N - \beta \tag{1}$$

where $K_1$ is a constant, N is the number of strokes of the press slide, and $\beta$ is the apparent slip angle. This equation will be further described later.

Figure 2:
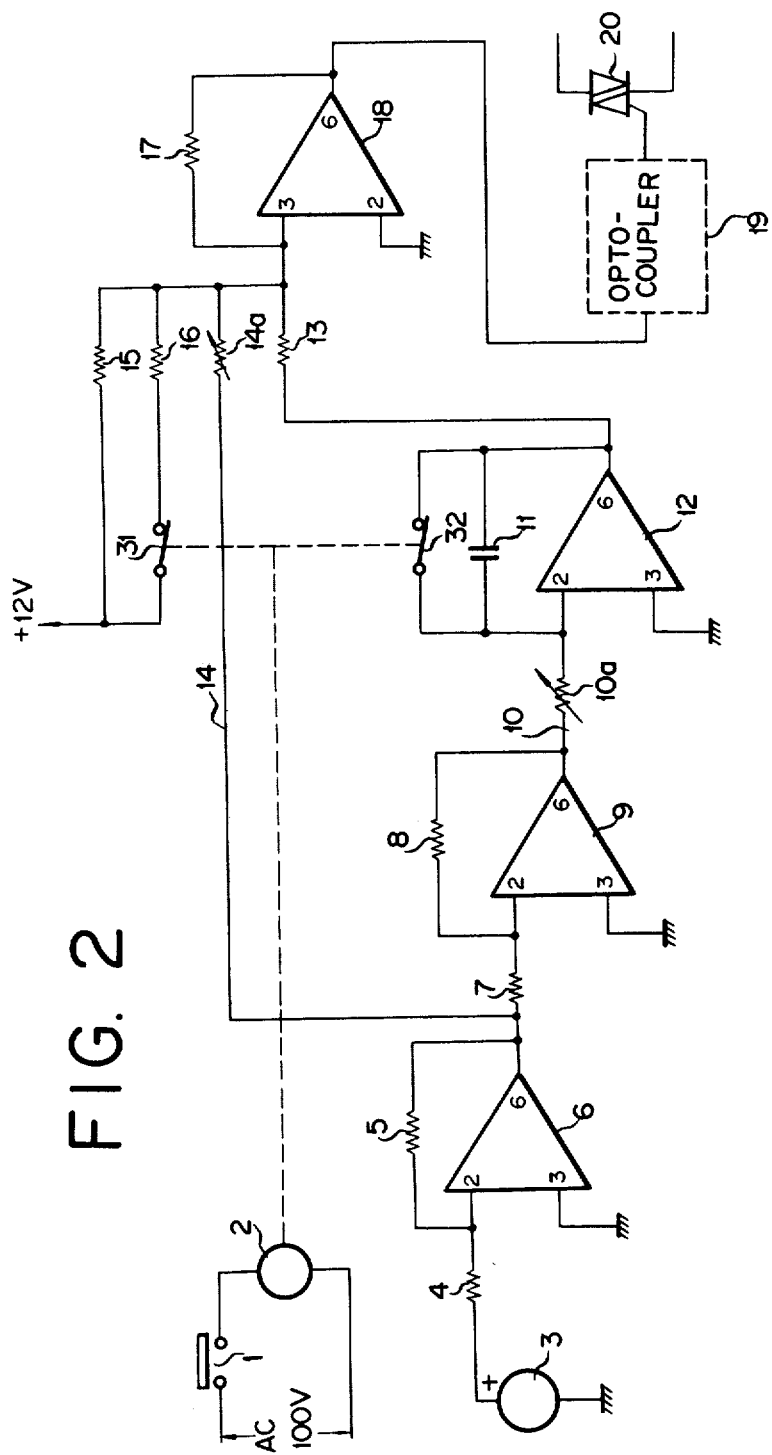
FIG. 2 is a circuit diagram showing one embodiment of a brake timing control apparatus control apparatus constructed in accordance with the present invention.

Referring now to FIG. 2, there is shown one embodiment of a brake timing control apparatus made in accordance with the present invention, in which designated at 1 is a rotary cam switch controlled by a rotary cam (not shown) mounted for synchronous rotation with the crank shaft and designated at 2 is a relay which is energized to open normally closed switches 31 and 32 in accordance with a closure of the rotary cam switch 1.

The apparatus comprises a detector 3 associated with the variable speed motor for generating a voltage proportional to the speed of rotation of the motor, namely the number of strokes of the press slide. The output voltage of the detector 3 is coupled to a first invertor which includes an input resistor 4 having its one end connected to the output of the detector 3, a feedback resistor 5, and a first inversion type operational amplifier 6 having one of its inputs connected to the other end of the input resistor 4 and the other input grounded. The output of the first invertor is connected to a second invertor which includes an input resistor 7 having its one end connected to the output of the first operational amplifier 6, a feedback resistor 8, and a second inversion type operational amplifier 9 having one of its inputs connected to the other end of the input resistor 7 and the other input grounded. The output of the second invertor is coupled to an integrator which includes an variable input resistor 10a having its one end connected to the output of the second operational amplifier 9, a capacitor 11 paralleled by the relay controlled switch 32, and a third inversion type operational amplifier 12 having one of its inputs connected to the other end of the input resistor 10a and the other input grounded.

The apparatus also comprises a comparator including a feedback resistor 17 and a fourth inversion type operational amplifier 18 having one of its inputs connected through a resistor 13 to the output of the third operational amplifier 12 and also through a resistor 15 paralleled by a series circuit of a resistor 16 and the relay controlled switch 31 to a reference voltage source and having the other input grounded. The output of the fourth operational amplifier 18 is connected through an opto-coupler 19 to the gate of a bi-directional thriode thyristor 20 such as sold by General Electric Company under the Tradename "Triac".

Also provided in the apparatus is a function generator responsive to the output voltage of the detector 3 for providing a volatge proportional to the approximated slip angle. In this embodiment, the function generator is in the form of a circuit 14 including a resistor 14a having its one end connected to the output of the first operational amplifier 6 and the other end connected to the one input of the fourth operational amplifier 18.

The operation of FIG. 2 embodiment will now be described. First, the integrator is assumed to start its operation at the time the crank shaft is at zero degree in each stroke of the press slide for easier understanding of the principles of the present invention.

The voltage Vi appearing at the output of the detector 3, which is proportional to the speed of rotation of the motor, namely the number of strokes N of the press slide, can be expressed by $$Vi = K_2 \cdot N \quad (2)$$

where $K_2$ is a constant. The output voltage Vi of the detector 3 is derived to the first invertor which provides a inverted voltage at its output. The inverted voltage is then supplied to the second invertor which provides an output voltage inverted again to have the same polarity as the output voltage Vi from the detector 3. The resulting voltage Vi from the second invertor is derived to the integrator which provides at its output a voltage Vo expressed by $$Vo = -\frac{1}{CR} \int_0^t Vi \cdot dt \quad (3)$$

$$= -\frac{1}{CR} \cdot Vi \cdot t$$

where C is the capacitance of the capacitor 11, R is the resistance of the resistor 10a, and t is the time taken after the integrator is placed into operation.

Assuming that t is the time required for the crank shaft to rotate through 360 degrees from its zero degree angular position or required for the press slide to move one stroke, t is expressed as:

$$t = K_3/N \quad (4)$$

where $K_3$ is a constant, and the voltage apperating at the output of the integrator when the press slide reaches its stroke end is obtained by substituting equations (2) and (4) into equation (3) as follows:

$$Vo_1 = -\frac{1}{CR} \cdot K_2 N \cdot K_3/N \quad (5)$$

$$= -\frac{K_2 \cdot K_3}{CR}$$

Figure 3:
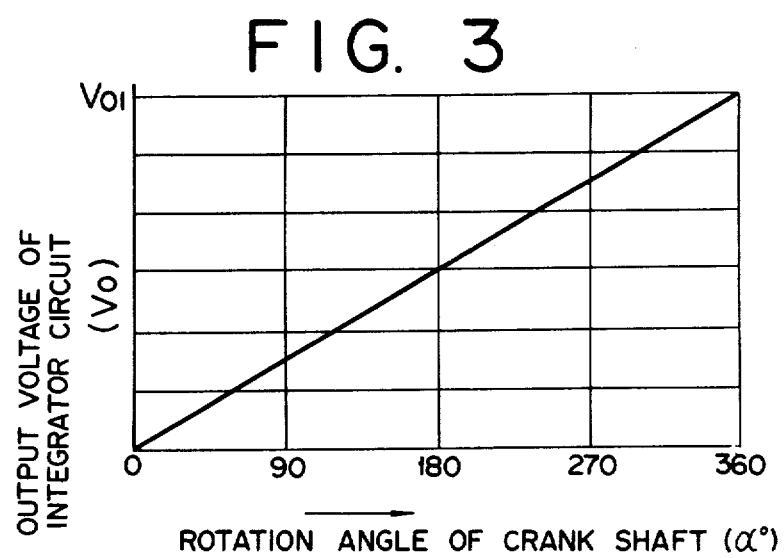
FIG. 3 is a graph plotting integrator output voltage with respect to crank shaft rotation angle.

It will be apparent from equation (4) that the output voltage $Vo_1$ of the integrator when the press slide reaches its stroke end is always constant regardless of the speed of rotation of the crank shaft, namely the number of strokes of the press slide. FIG. 3 shows a line of integrator output voltage versus crank shaft rotation angle which is expressed by:

$$Vo = K_4 \cdot \alpha \quad (6)$$

where $\alpha$ is the angle through which the crank shaft rotates from its zero degree angular position, and $K_4$ is a constant equal to $K_2 \cdot K_3/360CR$.

If the reference voltage applied to the one input of the fourth operational amplifier 18 is set at $Vo_1$, the comparator will put out a stop signal for initiating braking on the press machine when the press slide reaches its top dead center. In order to stop in practice the moving press slide at its top dead center, it is further required to take into consideration the slip angle through which the crank shaft tends to continue to rotate after braking on the press machine is initiated. The function generator included in the brake timing control apparatus of the present invention is for this purpose which is adapted to provide a voltage Vf expressed by:

$$Vf = K_5 \cdot (K_1 \cdot N - \beta) \quad (7)$$

where $K_5$ is a constant.

Figure 4:
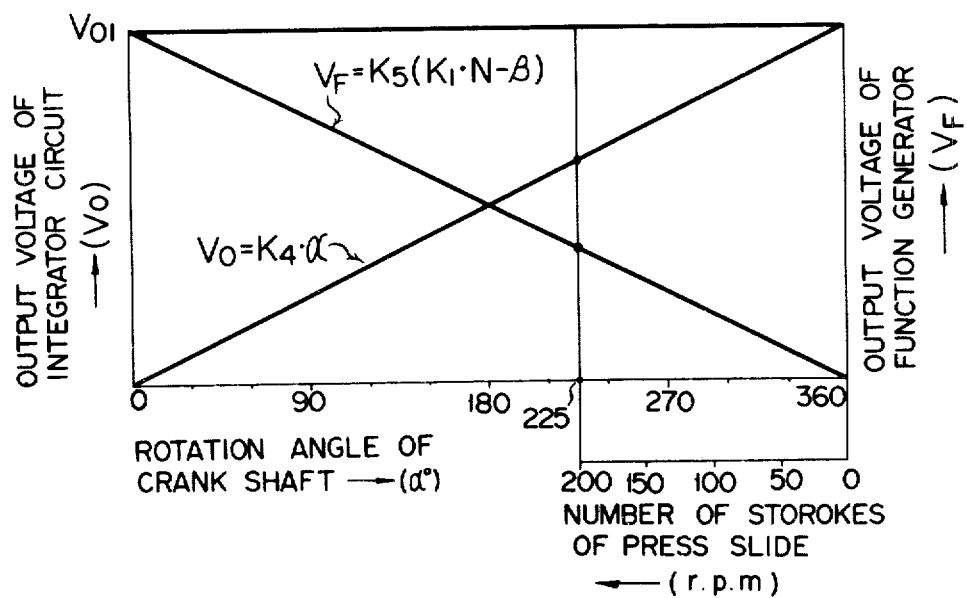
FIG. 4 is a diagram used to explain the operation of the brake timing control apparatus with the integrator actuated when the crank shaft starts to rotate from its top dead center.

The voltage Vf from the function generator is supplied to the one input of the operational amplifier 18 of the comparator together with the output voltage Vo of the integrator and the reference voltage set at $Vo_1$. The comparator additively combines the voltages Vf and Vo and compares the sum of the voltages Vf and Vo with the reference voltage $Vo_1$ to provide a stop signal for initiating braking on the press machine when the sum of the voltages Vf and Vo reaches the reference voltage $Vo_1$. In this case, the constants $K_1$, $K_4$ and $K_5$ are properly selected to establish a relationship as shown in FIG. 4 wherein a line of function generator output voltage versus the number of strokes of the press slide is superimposed in symmetrical manner on a line of integrator output voltage versus crank shaft rotation angle under the condition of $\beta = 0$ so that a condition $Vo_1 = Vo + Vf$ can be established at any number of strokes.

Although the operation of the brake timing control apparatus of the present invention has been described under an assumption that the integrator starts its operation at the time the press slide starts its stroke from its top dead center, it is often necessary for the press slide to start in the course of its stroke, such as found in safety one-stroke operation which will be described with reference to FIGS. 5 and 6.

Figure 5:
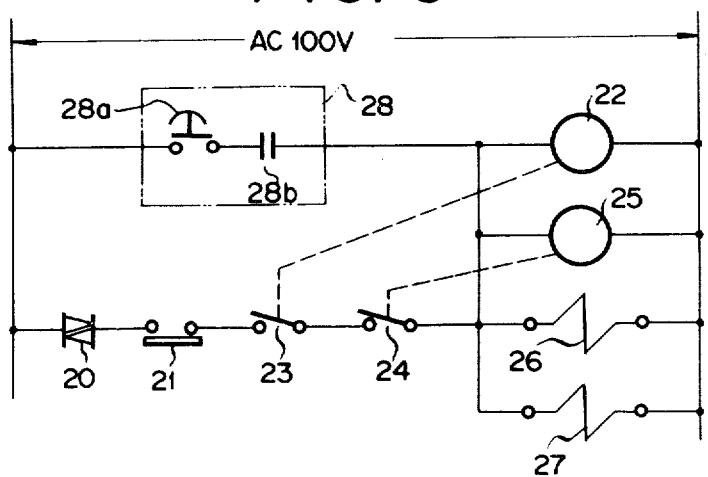
FIG. 5 is a circuit diagram showing a circuit used for safety one-stroke operation.

FIG. 5 shows a safety one-stroke operation control arrangement in which an AC 100 volt power supply is coupled through a series circuit of the Triac 20, a rotary cam switch 21, relay operated switches 23 and 24 and also through an operation switch 28 across a parallelcircuit of relays 22 and 25 closing the respective switches 23 and 24 when energized, clutch and brake solenoids 26 and 27. The clutch solenoid 26 shoves the clutch in when energized and the brake solenoid 27 releases the brake when energized. The operation switch 28 includes a push button switch 28a and an anti-actuation contact 28b controlled by a circuit (not shown) such that the contact 28b remains closed until, for example, the angle of rotation of the crank shaft reaches 200 degrees in case that it is once turned on, whereas in case that the contact 28b is once turned off it remains off unless the push button 28a is released at the time when the slide reaches its top dead center. The rotary cam switch 21 is operated by a rotary cam (not shown) mounted for synchronous rotation with the crank shaft and its closed range is shown in FIG. 6.

In operation, when the push button 28a is depressed, the relays 22 and 25 are energized to close the respective switches 23 and 24 and also the clutch solenoid 26 is energized to engage the clutch and the brake solenoid 27 is energized to release the brake so that the press slide start to move. When the push button 28a is released before the crank shaft reaches an angular position indicated by the letter A, the relays 22 and 25 and the solenoids 26 and 27 are deenergized so that the clutch is released and the brake is on to stop movement of the press slide. On the other hand, after the crank shaft passes past the angular position A, the rotary cam switch 21 is closed to establish a self-holding circuit including the Triac 20, the cam switch 21, and the relay controlled switches 23 and 24 so as to hold the relays 22 and 25 and the clutch and brake solenoids 26 and 27 energized even if the push button 28a is released. That is, the machine operator can release the push button 28a to stop the press slide before the crank shaft reaches the angular position A. Such safety one-stroke operation is useful particularly in resetting the article on a proper position of the press slide after press operation is started without any danger.

Figure 7:
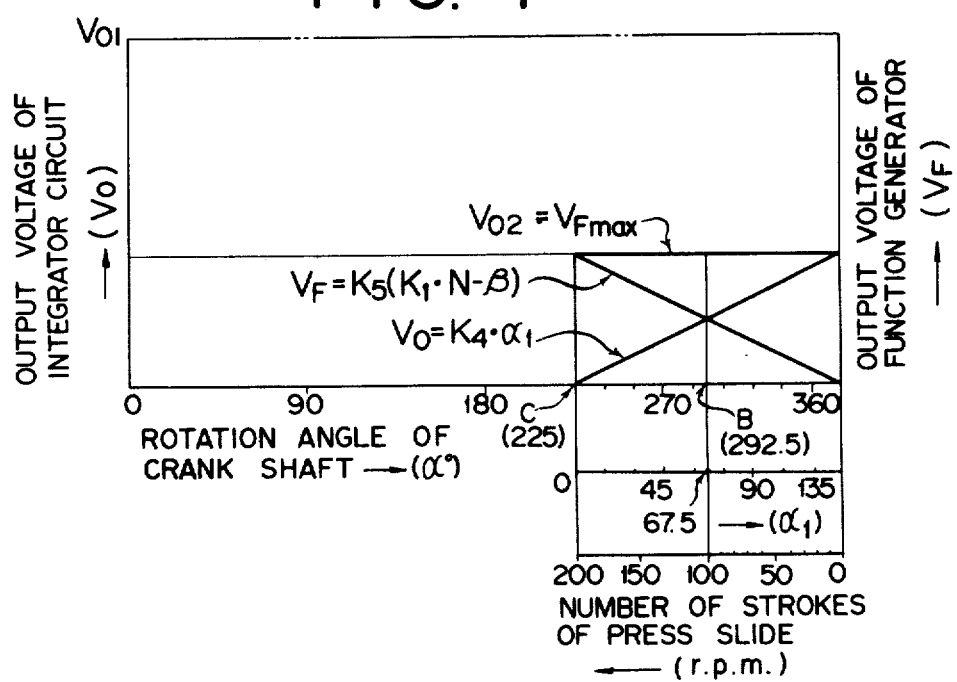
FIG. 7 is a diagram used in explaining the operation of the brake timing control apparatus with the integrator actuated in the course of each stroke of the press slide.

In case where the press slide is brought to stop and initiated to move in the course of its stroke such as found in safety one-stroke operation, the constants $K_1$, $K_4$ and $K_5$ are properly selected to establish a relationship as shown in FIG. 7. In FIG. 7, a line of function generator output voltage versus the number of strokes of the press slide and a line of integrator output voltage versus crank shaft rotation angle are superimposed symmetrically with respect to the intersecting point under the condition of $\beta=o$ so that a condition $V_{o2}=-V_o+V_F$ is always established at a given number of strokes, where $V_{o2}$ is the voltage set as the reference voltage which is equal to that produced from the integrator when the press slide reaches its top dead center. The letter $\alpha_1$ of FIG. 7 indicates the angle through which the crank shaft rotates after the rotary cam switch 1 is turned on to initiate the operation of the integrator.

Figure 6:
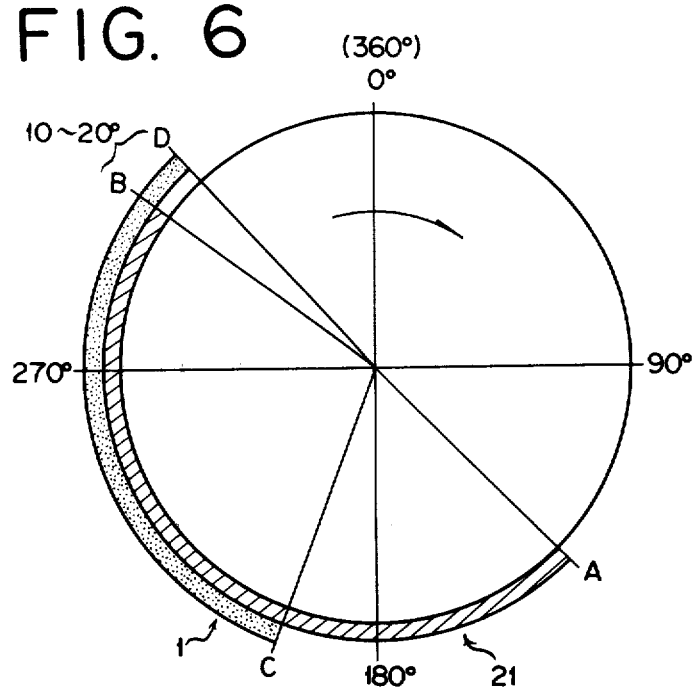
FIG. 6 is a diagram showing the operation of the rotary cam switches.

As shown in FIG. 6, the rotary cam switch 1 is closed while the crank shaft rotates from the angular position C where the stop signal is put out when the crank shaft is rotated at the maximum speed to the angular position D. The position D is delayed at 10 to 20 degrees from the angular position B where the stop signal is put out when the crank shaft is rotated at the minimum speed. The closing of the rotary cam switch 1 opens the normally closed switch 31 and also the normally closed switch 32. Then the relay controlled switch 31 is closed, it connects the resistor 16 in parallel with the resistor 15 to provide a higher reference voltage to the comparator so as to maintain the output of the operational amplifier 18 positive and thus maintain the Triac 20 turned on. When the relay controlled switch 32 is closed, it maintains the integrator non-operative.

Figure 8:
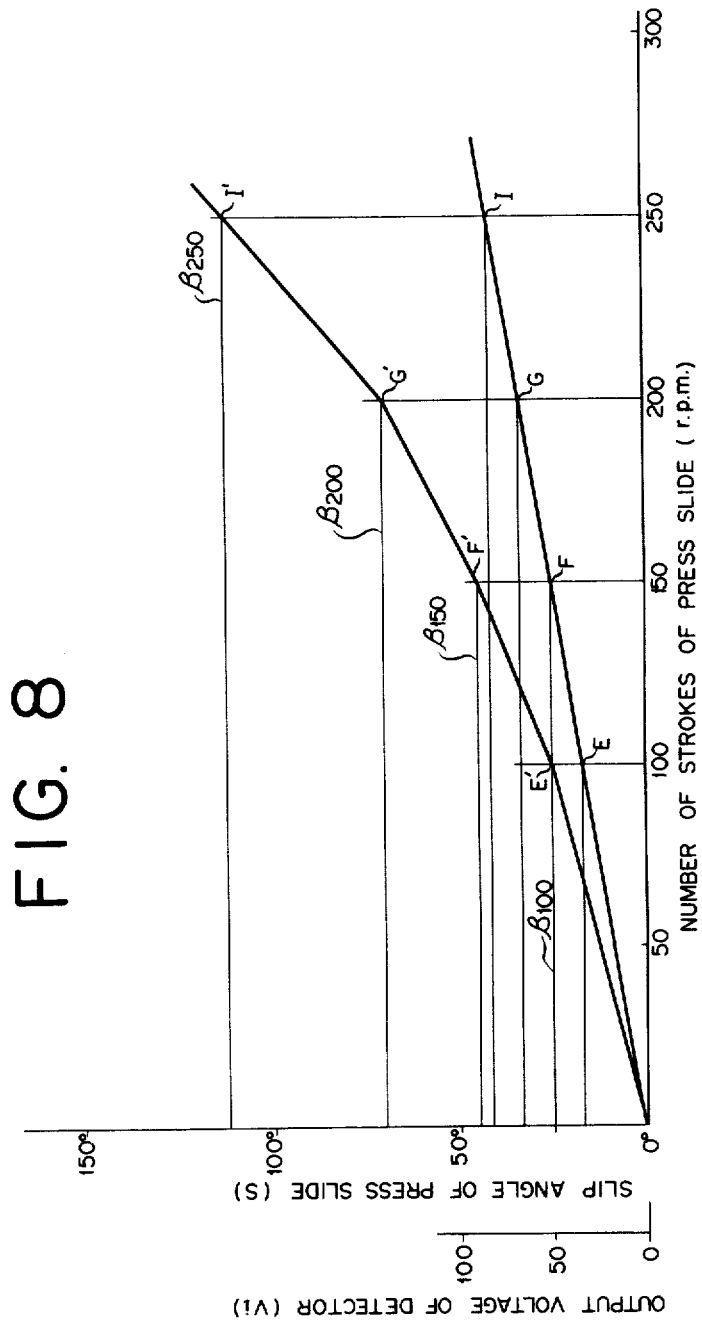
FIG. 8 is a graph showing approximated slip angle as a function of the number of strokes of the press slide.

Although the slip angle approximation shown in FIG. 1 and utilized in FIG. 1 embodiment is useful in connection with a press machine operative within a relatively small and narrow range of the number of strokes of the press slide, it is not sufficient in accuracy when used for a press machine operable over a wide and large range of the number of strokes of the press slide. FIG. 8 shows an alternative slip angle approximation suitable in this case where the available renge of the number of strokes of the press slide is divided into a proper number of subrange such that the slip angle within each sub-range can be approximated with a linear line.

Figure 9:
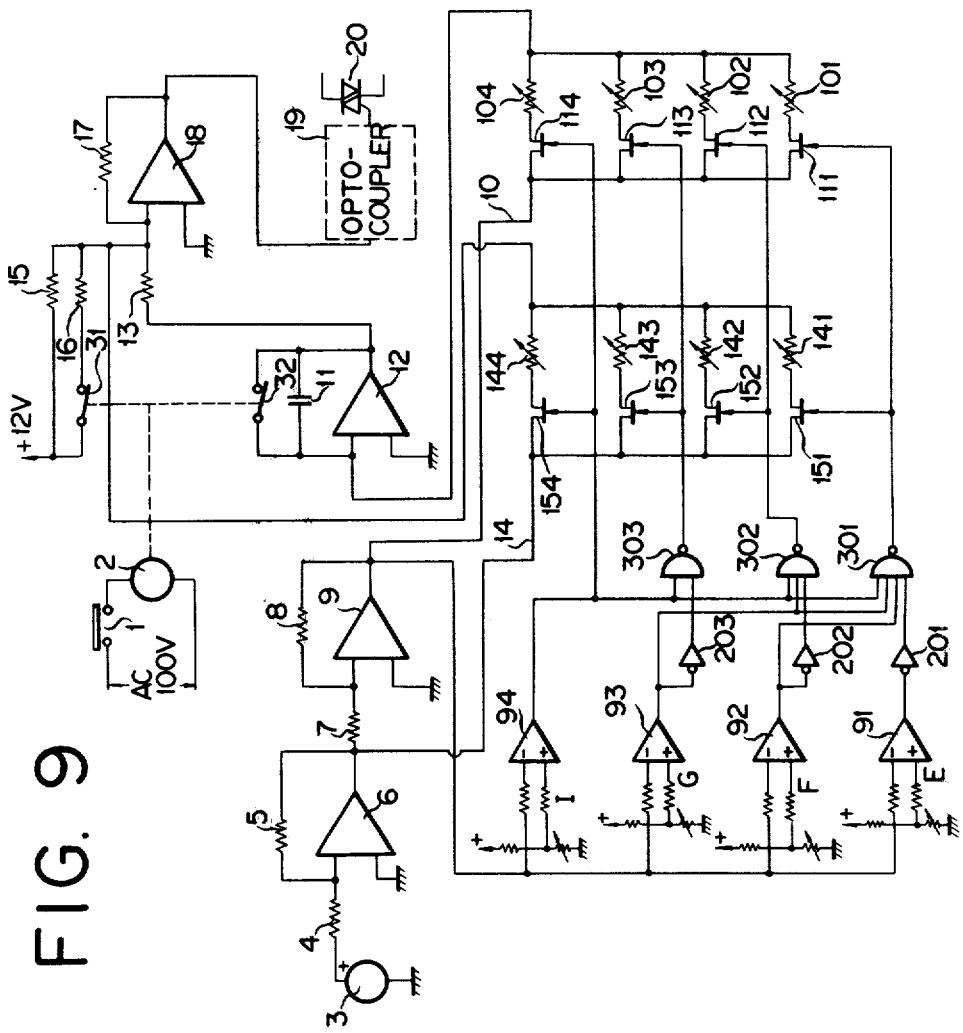
FIG. 9 is a circuit diagram showing an alternative embodiment of the present invention.

Referring to FIG. 9 there is illustrated another embodiment of the present invention which untilizes the alternative slip angle approximation. Like reference numerals have been applied to FIG. 6 with respect to the equivalent components shown in FIG. 2. The output voltage of the second operational amplifier 9, which is proportional to the number of strokes of the press slide, is applied to respective one inputs of first to fourth inversion type operational amplifiers 91 to 94 which have the other inputs receiving respective reference voltages E, F, G and I set for respective sub-ranges of the number of strokes as shown in FIG. 8. Each operational amplifier is inversed when the output voltage from the second operational amplifier 9 reaches the reference voltage.

First to third NAND gates 301 to 303 are provided so that a signal can be obtained from selected one of the first to third NAND gates 301 to 303 and the fourth inversion type operational amplifier 94, depending upon the output voltage of the second operational amplifier 9. The reference numerals 201 and 203 indicates first to third invertors, respectively.

The output voltage of the first operational amplifier 6 is coupled through a first circuit 14 to the comparator including the operational amplifier 18. The output voltage of the second operational amplifier 9 is coupled through a second circuit 10 to the integrator including the operational amplifier 12. The first circuit 14 includes first to fourth variable resistors 141 to 144 connected in series with respective field effect transistors (FETs) 151 to 154, the respective series circuits being connected in parallel with each other. The second circuit 10 includes fifth to eighth variable resistors 101 to 104 connected in series with respective field effect transistors 111 to 114, the respective series circuits being connected in parallel with each other. The first and fifth variable resistors 141 and 101 are for adjusting the voltage E to a voltage E' (see FIG. 8), the second and sixth variable resistors 142 and 102 are for adjusting the voltage F to a voltage F', the third and seventh variable resistors 143 and 103 are for adjusting the voltage G to a voltage G'. and the fourth and eighth variable resistors 144 and 104 are for adjusting the voltage I to a voltage I' so as to provide voltage compensation when the subrange of the number of strokes is changed from one to another.

The first and fifth field effect transistors 151 and 111 are turned on in response to the output voltage of the first NAND gate 301. The second and sixth field effect transistors 152 and 112 are turned on in response to the output voltage of the second NAND gate 302. The third and seventh field effect transistors 153 and 113 are turned on in response to the output voltage of the third NAND gate 303. The fourth and eighth field effect transistors 154 and 114 are turned on in response to the output voltage of the fourth inversion type operational amplifier 94.

The operation of FIG. 9 embodiment will now be described. If the reference voltage is set at $V_{o2} = K_1 \cdot N_{max} - \beta$ which is equal to the voltage $Vf_{max}$ of the function generator proportional to the approximated slip angle when the press slide moves at the maximum number of strokes, the condition $V_{o2} = V_o + Vf$ can be established as described in connection with FIG. 2 embodiment even if the operation of the integrator including the operational amplifier 12 is initiated by the rotary cam switch 1 in the course of the press operation. That is, since the output voltage of the second operational amplifier 9 is over the voltage E (FIG. 8) at a 100 r.p.m. press slide stroke frequency, the output of the first operational amplifier 91 is at the low (negative) level, while the outputs of the second to fourth operational amplifiers 92 to 94 are at the high (positive) level, whereby the output of the first NANd gare 301 changes from the low (negative) level to the high (positive) level to render the first and fifth field effect transistors 151 and 111 conductive so that the integrator including the operational amplifier 12 can receive an adjusted voltage E'. Thus, a sop signal for initiating braking on the press machine is provided at a slip angle $\beta_{100}$ (FIG. 8) at the number of strokes of the press slide ranging from 100 to 150 r.p.m.. Similarly, a stop signal is provided at a slip angle $\beta_{150}$ (FIG. 8) at the number of strokes of the press slide ranging from 150 to 200 r.p.m., at a slip angle $\beta_{200}$ (FIG. 8) at the number of strokes of the press slide ranging from 200 to 250 r.p.m., and at a slip angle $\beta_{250}$ at the number of strokes of the press slide above 250 r.p.m..

It is therefore apparent that there has been provided, in accordance with the present invention, a brake timing control method and apparatus useful in connection with a press machine including a press slide driven through a crank shaft by a variable speed motor for positively stop movement of the press slide at its top dead center regardless of the speed of rotation of the motor or the number of strokes of the press slide that fully satisfies the objects, aims and advantages set forth above. While the present invention has been described in connection with specific embodiments thereof, it is evident that many alternatives, modifications and variations will be apparent to those skilled in the art. Accordingly, it is intended to embrace all alternatives, modifications and variations that fall within the spirit and broad scope of the appended claims.

What is claimed is:

1. A brake timing control apparatus for use with a press machine including a press slide driven through a crank shaft by a variable speed motor, the apparatus comprising detector means responsive to the speed of rotation of the motor for providing an output voltage proportional to the motor speed, first invertor means receiving the output voltage of the detector means for inverting the same, second invertor means receiving the inverted output voltage of the first invertor means for inverting the same again, number of strokes range detector means responsive to the output voltage of the second invertor means for specifying one from a plurality of ranges of the number of strokes of the press slide predetermined such that each approximated slip angle characteristic is available in each range of the number of strokes, first circuit means receiving the output voltage of the second invertor means for providing an output voltage according to the range of the number of strokes specified by the number of strokes range detector means, second circuit means receiving the output voltage of the first invertor means for providing an output voltage representing a slip angle through which the crank shaft as well as the press slide will continue to move after braking is initiated on the press machine in accordance with the range of the number of strokes specified by the number of strokes range detector means, integrator-invertor means receiving the output voltage of the first circuit means for integrating and inverting the same, means for actuating and resetting the integrator-invertor means during each stroke of the press slide, a reference voltage source for providing a predetermined reference voltage, and comparator means receiving the voltages derived from the integrator-invertor means and the second circuit means and also the reference voltage for additively combining them to provide a stop signal for initiating braking on the press machine when the sum of the former two voltages reaches the reference voltage, whereby the press slide can be brought to positively stop at its top dead center regardless of the speed of rotation of the crank shaft.

2. A brake timing control apparatus as set forth in claim 1, where the first circuit means comprises a plurality of series circuits each composed of a resistor and a field effect transistor responsive to the output signal of the number of strokes range detector means for connecting the resistor between the output of the second invertor means and the input of the integrator-invertor means.

3. A brake timing control apparatus as set forth in claim 1, where the second circuit means comprises a plurality of series circuits each composed of a resistor and a field effect transistor responsive to the output signal of the number of strokes range detector means for connecting the resistor between the output of the first invertor means and the input of the comparator means.

* * * * *